United States Patent
Hui et al.

(10) Patent No.: US 8,151,316 B2
(45) Date of Patent: Apr. 3, 2012

(54) SYNCHRONIZING VISUAL CUES TO MULTIMEDIA PRESENTATION

(75) Inventors: Jonathan Hui, Fremont, CA (US); Chris Yeo, Redwood City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1736 days.

(21) Appl. No.: 10/637,625

(22) Filed: Aug. 11, 2003

(65) Prior Publication Data

US 2004/0030994 A1 Feb. 12, 2004

Related U.S. Application Data

(63) Continuation of application No. 09/282,580, filed on Mar. 31, 1999, now abandoned.

(51) Int. Cl.
*H04N 7/16* (2006.01)
(52) U.S. Cl. ........... 725/135; 725/32; 725/110; 725/112
(58) Field of Classification Search .................. 707/522, 707/100, 102, 104; 715/201–217; 725/58, 725/60–61, 109–110, 112
See application file for complete search history.

(56) References Cited

U.S. PATENT DOCUMENTS

| | | | | |
|---|---|---|---|---|
| 5,583,980 | A | | 12/1996 | Anderson ..................... 345/473 |
| 5,586,239 | A | * | 12/1996 | Ueda ............................ 715/207 |
| 5,774,666 | A | * | 6/1998 | Portuesi ....................... 725/110 |
| 5,802,299 | A | | 9/1998 | Logan et al. ............... 707/501.1 |
| 5,860,073 | A | | 1/1999 | Ferrel et al. .................. 707/522 |
| 5,924,104 | A | | 7/1999 | Earl ........................... 707/501.1 |
| 6,067,085 | A | | 5/2000 | Modh et al. .................. 345/711 |
| 6,263,332 | B1 | * | 7/2001 | Nasr et al. ......................... 707/5 |
| 6,349,410 | B1 | | 2/2002 | Lortz ........................... 725/110 |
| 6,442,755 | B1 | * | 8/2002 | Lemmons et al. ............. 725/47 |
| 6,604,242 | B1 | * | 8/2003 | Weinstein et al. ............ 725/109 |
| 6,615,408 | B1 | * | 9/2003 | Kaiser et al. ................. 725/112 |
| 6,724,915 | B1 | * | 4/2004 | Toklu et al. .................. 382/103 |
| 7,185,049 | B1 | * | 2/2007 | Benitez et al. ................ 709/203 |
| 2002/0112249 | A1 | * | 8/2002 | Hendricks et al. ........... 725/136 |
| 2005/0097622 | A1 | * | 5/2005 | Zigmond et al. ............. 725/135 |
| 2005/0198569 | A1 | * | 9/2005 | Fong et al. .................... 715/513 |
| 2007/0294334 | A1 | * | 12/2007 | Hickman ...................... 709/203 |

OTHER PUBLICATIONS

Simon S.Y. Shim, Jerry Gao, and Ying Wang Multimedia presentation components in e-commerce, Jun. 8-9, 2000 IEEE CNF, pp. 158-165.*
Petri Vuorimaa, Teemu Ropponen, Niklas von Knorring, and Mikko Honkala, A java based XML browser for consumer devices, Mar. 2002, Proceedings of the 2002 ACM symposium on Applied computing SAC '02, pp. 1094-1099.*
Jacco van Ossenbruggen et al, requirements for multimedia markup and style sheets on the world wide web, Computer Networks and ISDN Systems, vol. 30, issue 1-7 (Apr. 1998).*
Synchronized Multimedia Integration Language, Nov. 1997, edited by Phillip Hoscha (Sep. 9, 1997).*
"Extensible Markup Language (XML) 1.0", W3C XML Working Group, Feb. 10, 1998, 32 pages.
"Synchronized Multimedia Integration Language (SMIL) 1.0 Specification", W3C XML Working Group, Jun. 15, 1998, 39 pages.

* cited by examiner

*Primary Examiner* — James R Sheleheda
*Assistant Examiner* — Anthony Bantamoi
(74) *Attorney, Agent, or Firm* — Fitzpatrick, Cella, Harper & Scinto

(57) ABSTRACT

A spatial marker specified in extensible mark-up language (XML) for use in connection with an XML-based synchronized multimedia presentation. The spatial marker specifies a visual cue for a multimedia element in the presentation, together with the visual appearance of the cue and spatial and temporal characteristics of the cue. The spatial and temporal characteristics of the cue synchronize the cue with the multimedia presentation. In operation, and upon encountering such a spatial marker, an XML-based multimedia browser displaying the multimedia presentation to a user would display the visual cue using the specified visual appearance, and in the spatial and temporal relationships with the multimedia element as specified by the spatial and temporal characteristics of the marker.

16 Claims, 8 Drawing Sheets

```
<par>                                              100
    <seq>                                          110
        <video src = "V1.mpg"/>                    130
        <video src = "V2.mpg"/>                    140
    </seq>                                         111
    <seq>                                          120
        <par>                                      150
            <video src = "V31.mpg"/>               170
            <video src = "V32.mpg"/>               180
        </par>                                     151
        <seq>                                      160
            <video src = "V4.mpg"/>                190
            <video src = "V5.mpg"/>                200
        </seq>                                     161
    </seq>                                         121
</par>                                             101
```

```
<par>—100
    <seq>—110
        <video src = "V1.mpg"/>—130
        <video src = "V2.mpg"/>—140
    </seq>—111
    <seq>—120
        <par>—150
            <video src = "V31.mpg"/>—170
            <video src = "V32.mpg"/>—180
        </par>—151
        <seq>—160
            <video src = "V4.mpg"/>—190
            <video src = "V5.mpg"/>—200
        </seq>—161
    </seq>—121
</par>—101
```

FIG. 1

$t_0 \longrightarrow t_1$ $t_1 \longrightarrow t_2$

SYNCHRONIZING VISUAL CUES TO MULTIMEDIA PRESENTATION

This application is a continuation application of U.S. application Ser. No. 09/282,580, filed Mar. 31, 1999, now pending.

BACKGROUND OF THE INVENTION

1. Field of the Invention

The present invention concerns multimedia presentations, and particularly the superimposition of visual cues over elements in the multimedia presentation, with both temporal and spatial synchronization of the visual cues to the presentation itself.

2. Description Of The Related Art

Various mark-up languages have been proposed for use in Internet and Intranet browsing of web-based pages. Currently, the most popular mark-up language is hypertext mark-up language (HTML). HTML defines spatial relationships and visual appearance of a web page when the page is displayed at a user's browser.

One disadvantage of HTML is that it is difficult to display a multimedia presentation using HTML alone. Moreover, it is nearly impossible to synchronize different multimedia presentations within the same web page. Thus, although with HTML it is possible, though difficult, to display a video file, it is nearly impossible to synchronize two different video files for simultaneous display on the same web page.

In response to these shortcomings, the World Wide Web Consortium Working Group on synchronized multimedia has proposed an extensible mark-up language (XML) based language that permits synchronization of multimedia presentations. A proposed standard has been circulated, entitled "Synchronized Multimedia Integration Language" (SMIL), version 1.0, the contents of which are incorporated herein by reference. Importantly, the SMIL standard permits both sequential and parallel presentation of multimedia files, thereby permitting synchronization either serially or parallelly of multimedia presentations.

Despite the advantages of the SMIL standard, there are situations in which it is desired to superimpose visual cues onto multimedia elements. For example, in a situation where the synchronized multimedia presentation is a real estate marketing promotion comprising a series of still images with a voice-over tour explaining highlights of the still images, it might be desirable to superimpose a visual cue (such as an arrow) on the video stills with the position of the cue synchronized with the voice explanations.

With SMIL, however, it is not now possible to provide for superimposition of a visual cue over a multimedia presentation, with the visual cue synchronized both temporally and spatially with the multimedia presentation.

SUMMARY OF THE INVENTION

It is an object of the invention to provide an XML-based spatial marker that can be synchronized both spatially and temporally with a synchronized multimedia presentation.

Accordingly, in one aspect, the invention is an XML-based tag that is keyed to a particular multimedia element of an XML-based multimedia presentation. The XML tag includes element attributes that define the visual appearance of the cue, its position, and its temporal characteristics such as begin time, end time or duration.

When a spatial marker is encountered by an XML-based browser that displays synchronized multimedia presentations to a user, the browser stores information concerning the multimedia element to which the visual cue is associated, together with information concerning the shape as well as the spatial and temporal characteristics of the visual cue. Thereafter, in synchronization with the display of the multimedia element, the browser displays the visual cue in the shape specified, and in the spatial and temporal relationships specified by the spatial and temporal characteristics.

By virtue of the foregoing, it is possible for a visual cue of desired shape to be synchronized both spatially and temporally with a multimedia presentation.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 1 shows a portion of document source code according to the SMIL 1.0 specification.

DETAILED DESCRIPTION OF THE PREFERRED EMBODIMENT

Figure 2A:
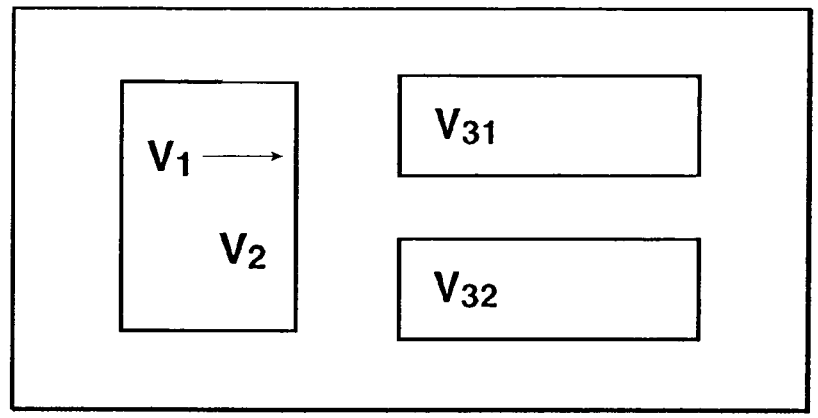
FIG. 2a shows a display of a web browser executing a first part of the FIG. 1 source code.

The present invention is specifically tailored for compatibility with the SMIL specification for multimedia presentations. However, because of the versatility of the invention, particularly in being XML-based, the invention is equally applicable to any XML-based implementation of multimedia presentation systems.

FIG. 1 shows an illustrative example of a representative SMIL source file portion utilizing a <spar> element, which is used to specify elements to be executed in parallel. The source file portion shown in FIG. 1 begins with <par> element 100 and ends with corresponding </par> notation 101. It should be noted that the <element></element> beginning/end syntax is an-XML grammar requirement.

According to the SMIL specification, all child elements nested one level below elements 100 and 101 are to be executed in parallel. Accordingly, since two child elements <seq> 110 and <seq> 120 exist at a first level below <par> element 100, the objects defined by elements 110 and 120 are each executed in parallel.

In the case of <seq> 110, two media object elements exist between <seq> 110 and end notation 111. Also according to the SMIL specification, elements existing as children to a <seq> element are executed sequentially. Accordingly, video statement 130 is processed, followed by video statement 140. It should be noted that statements 130 and 140 each utilize a XML shorthand beginning/end syntax in that end notation "/" is located within the statements declaration.

As described above, child elements to <seq> element 120 are executed in parallel with the child elements of <seq> element 110 by virtue of <par> element 100. Therefore, all elements between <seq> element 120 and notation 121 are processed in parallel with elements 130 and 140. In this regard, nested within element 120 and notation 121 are <par> element 150, corresponding notation 151, <seq> element 160 and notation 161. According to <seq> element 120, the video sources indicated by video statements 170 and 180 are first played in parallel, followed by the video sources of video statements 190 and 200, which are played sequentially.

Figure 2B:
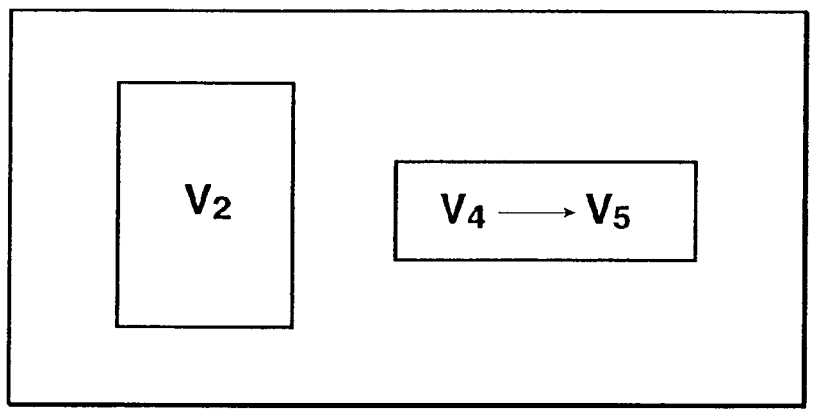
FIG. 2b shows a display of a web browser executing a second part of the FIG. 1 source code.

FIG. 2a and FIG. 2b illustrate a portion of a multimedia presentation governed by the SMIL source file shown in FIG. 1. As shown in FIG. 2a, video $V_1$ begins executing at a same time that video $V_{31}$ and video $V_{32}$ begin executing in parallel. In this example, while either one of video $V_{31}$ or video $V_{32}$ continues to play, video $V_1$ finishes and, by virtue of <seq> element 110, video $V_2$ begins to play. At time $t_1$, the one of video $V_{31}$ and video $V_{32}$ having a longer duration than the other terminates.

Next, as shown in FIG. 2b, video $V_2$ continues to play and, in parallel by virtue of <par> element 100, video $V_4$ begins to play. Video $V_4$ begins to play upon termination of the longer of video $V_{31}$ and $V_{32}$ due to <seq> element 120. After termination of video $V_4$, video $V_5$ is played.

Figure 2C:
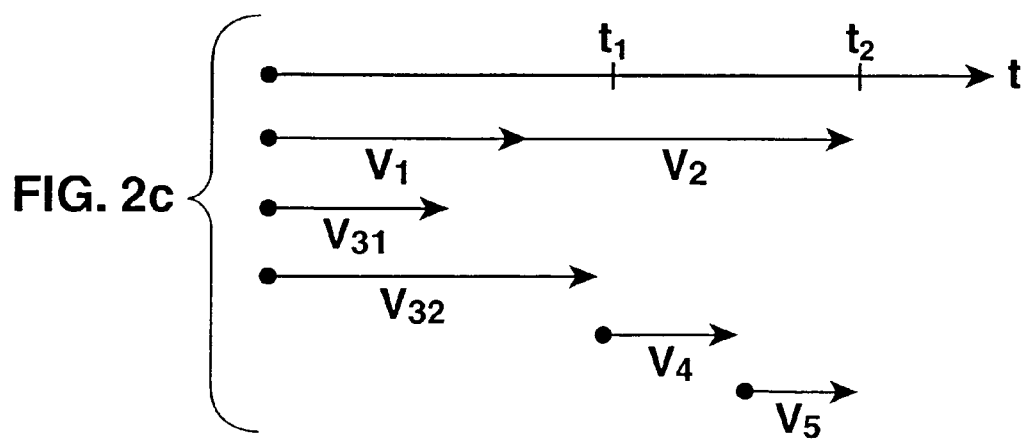
FIG. 2c is a timeline showing temporal relationships of multimedia objects executing according to the FIG. 1 source code.

FIG. 2c shows a timeline describing the presentation illustrated in FIG. 2a and FIG. 2b. It should be noted that FIG. 2c represents only one possible timeline resulting from the FIG. 1 SMIL source file, and that the timeline of FIG. 2c depends heavily upon relative durations of the video sources used therein. As described with respect to FIG. 1, FIG. 2a and FIG. 2b, the timeline of FIG. 2c shows that video $V_1$ and video $V_2$ are played sequentially while video $V_{31}$ and video $V_{32}$ are played in parallel. After termination of $V_{32}$, and while video $V_2$ is playing in parallel, video $V_4$ and video $V_5$ are sequentially played.

The SMIL specification describes a variety of different media object elements which can be used in addition to the representative <video> element of FIG. 1. These elements, which are described in detail in the SMIL specification, include <ref>, <animation>, <audio>, <img>, <video>, <text> and <textstream>. Each of the listed media object elements can also be used with specified attributes which influence their respective functionality.

Figure 3:
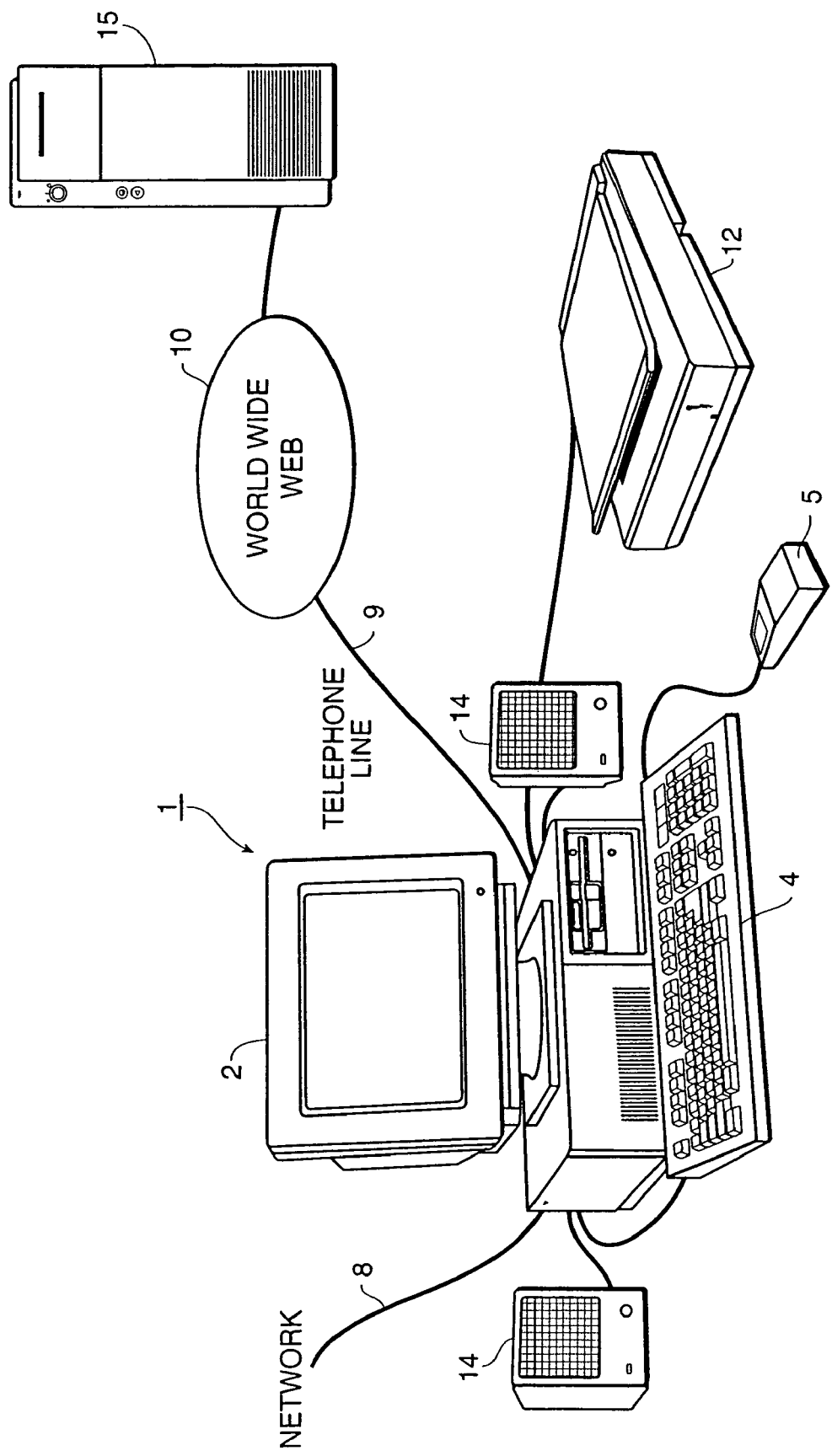
FIG. 3 is an outward view of a computing environment utilizing the present invention.

FIG. 3 is an outward view of a representative computing system utilizing the present invention.

Computing equipment 1 is preferably an Intel® Pentium®-based computer executing a windowing operating system such as Microsoft Windows98®. Computing equipment 1 includes display 2 for displaying images to a user and fixed disk 3 which stores computer-executable process steps of the windowing operating system and of other applications executed by computing equipment 1, such as a World Wide Web browser application. Fixed disk 3 also stores data files and device drivers for use by computing equipment 1. Also provided with computing equipment 1 are keyboard 4 for entering text and commands into appropriate fields displayed on display 2, and pointing device 5, such as a mouse, for pointing to, selecting and manipulating objects displayed on display 2.

Floppy disk drive 6 provides an interface to computing equipment 1 for reading data from and writing data to a floppy disk inserted therein. Using floppy disk drive 6, the above-described computer-executable process steps and/or data files may be input to computing equipment 1 and stored on fixed disk 3. Computer-executable process steps and data files may also be retrieved over a network via network connection 8 or via telephone line 9 from World Wide Web 10. In addition, image data files can be retrieved from scanner 12 and stored on fixed disk 3.

Multimedia speakers 14 provide sound output based on audio data files executed by computing equipment 1. Such an audio file may be in a monaural or stereo format, or in any other type of audio format, so long as computing equipment 1 is provided with a corresponding audio decoder and player application.

Computer-executable process steps and data files obtained by computing equipment 1 over World Wide Web 10 are transferred thereto by servers such as server 15. In response to a request for data, server 15 collects the required data, properly formats the data, and sends the data to computing equipment 1 over World Wide Web 10.

Figure 4:
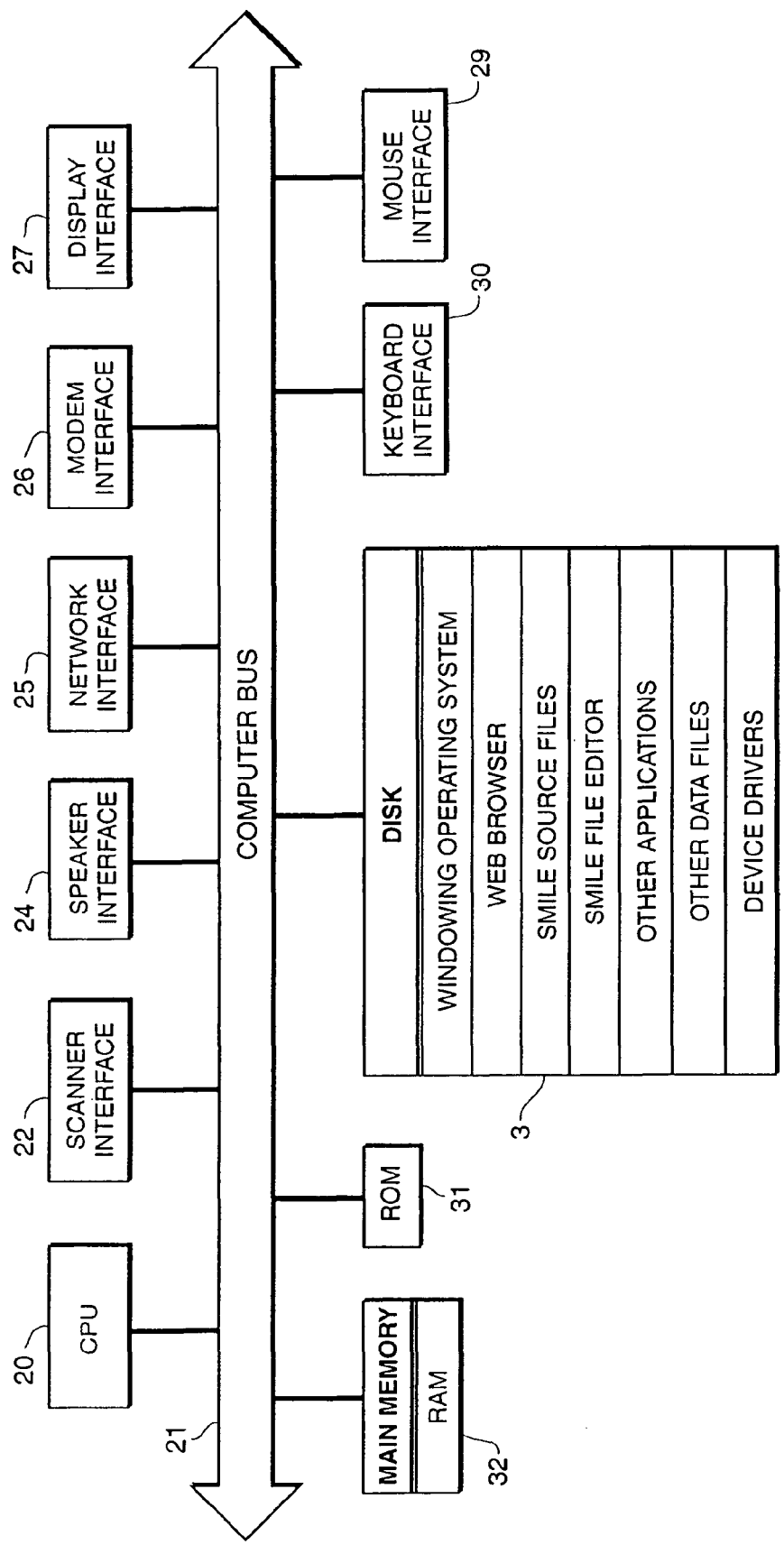
FIG. 4 is a block diagram illustrating the internal architecture of a computer utilizing the present invention.

FIG. 4 is a block diagram of the internal architecture of computing equipment 1. Shown in FIG. 4 is CPU 20, which as described above, is preferably a Pentium® processor. CPU 20 interfaces to computer bus 21, as does scanner interface 22 for interfacing to scanner 12, speaker interface 24 for interfacing to speakers 14, network interface 25 for interfacing to network connection 8, modem interface 26 for interfacing to telephone line 9 and display interface for interfacing to display 2. Mouse interface 29, which interfaces to mouse 5, and keyboard interface 30, which interfaces to keyboard 4, are also connected to bus 21. In this regard, interfaces 22 to 30 allow computing equipment 1 to access the functionality of their corresponding components. Also shown in FIG. 4 is disk 3, having stored thereon the aforementioned windowing operating system, a web browser with capability for displaying XML-based multimedia presentations (for example, by a plug-in), XML-based source files according to the present invention, which, for convenience sake, are hereinafter referred to as Synchronized Multimedia Integration Language Extended (SMILE) source files, a SMILE file editor application, other applications, other data files and device drivers.

The web browser stored on fixed disk 3 is preferably capable of interpreting elements and attributes of a SMILE source file and executing a corresponding multimedia presentation in accordance with functionality dictated by the elements and attributes. For example, Netscape Navigator and Internet Explorer are common HTML-enabled browsers, and a SMIL enabled browser is currently available from RealNetworks.

Read only memory (ROM) 31 stores invariant computer-executable process steps for basic system functions such as basic I/O, start-up routines, or instructions for receiving key strokes from keyboard 4.

Main random access memory (RAM) 32 provides CPU 20 with memory storage which can be accessed quickly. In this regard, computer-executable process steps of a web browser or other application are transferred from disk 3 over computer bus 21 to RAM 32 and executed therefrom by CPU 20.

Figure 5:
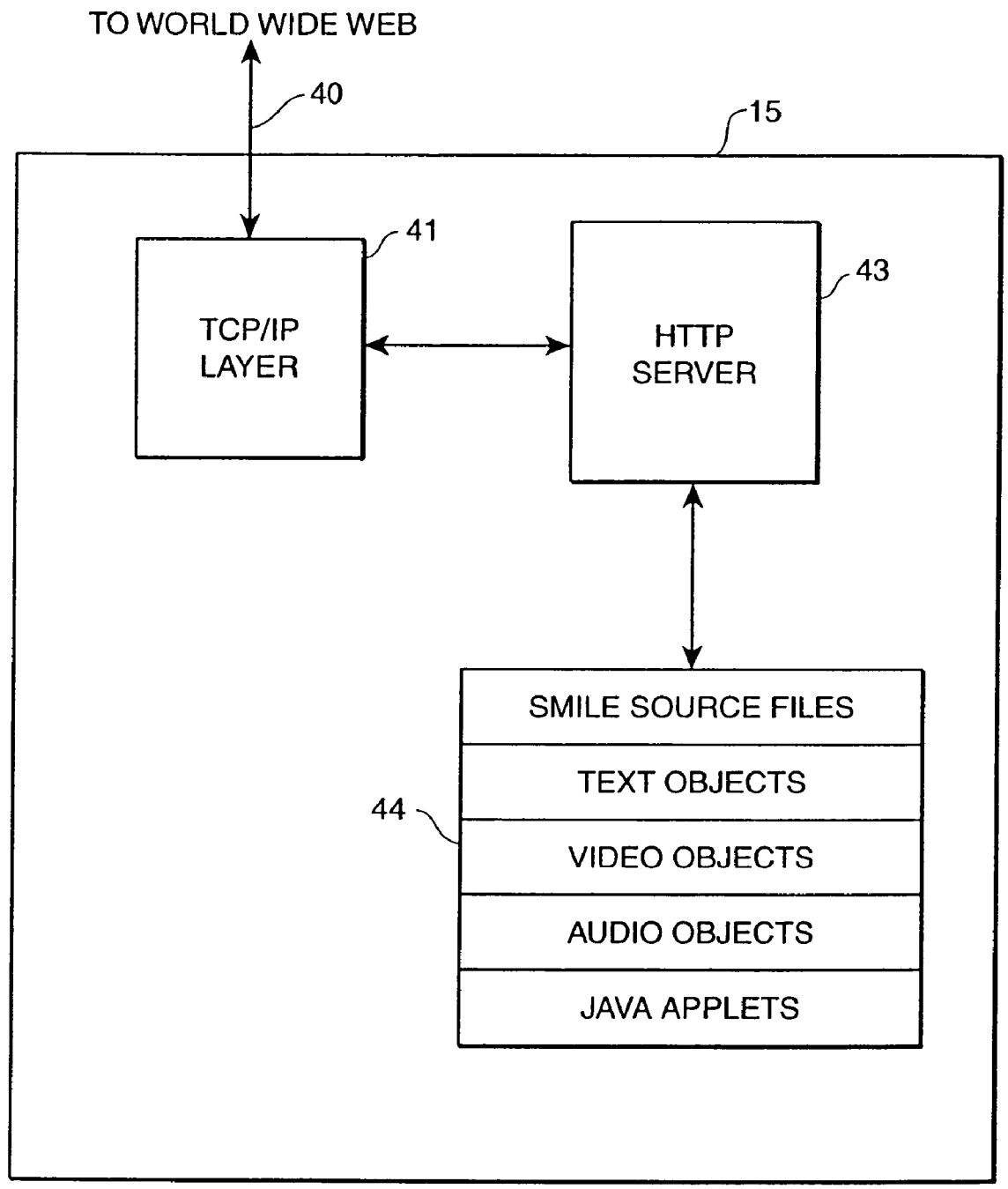
FIG. 5 is a block diagram illustrating the internal architecture of a web server utilizing the present invention.

FIG. 5 is a block diagram of several relevant components internal to server 15. As shown, server 15 is connected to World Wide Web 10 via World Wide Web connection 40, which may be a telephone line, a T1 line, a local area network connection, or the like. In a case that World Wide Web connection 40 connects directly to a local area network, the local area network is preferably connected to a router which, in turn, is connected to World Wide Web 10. In such a configuration, the router includes firewall software for prevention of unauthorized access to the local area network.

Data packets received over World Wide Web 10 (IP packets) travel over connection 40 to TCP/IP layer 41. TCP/IP layer 41 re-orders the IP packets and parses data therefrom.

The parsed data is delivered to HTTP (hypertext transfer protocol) server 43. Based on the parsed data, HTTP server 43 retrieves appropriate files from file storage 44 and transfers the files to TCP/IP layer 41. The files are then formatted into IP packets and sent over World Wide Web connection 40 to computing equipment 1.

According to the present invention, file storage 44 stores at least source files in a SMILE format according to the present invention, as well as text, video and audio objects which are referenced by stored SMILE source files. File storage 44 may also store Java applets which can be executed by a Java virtual machine of a web browser executing in computing equipment 1.

It should be noted that other servers and protocol layers may be used by server 15. In this regard, although HTTP server 43 and TCP/IP layer 41 are useful for transmitting text and fixed images over a firewall, a specialized streaming server utilizing the TCP or UDP protocol may be preferred for sending streaming audio or video data over World Wide Web 10.

One element transferrable by server 15 to computing equipment 1, in connection with a transfer of SMILE-based files, is a spatial marker element according to the invention. The spatial marker is XML-based and causes the browser to superimpose a designated spatial marker (or visual cue) over the ongoing multimedia presentation, with the spatial marker being synchronized both spatially and temporally with the presentation. Synchronization is effected by virtue of nesting, within the affected visual elements; specifically, the spatial marker element is nested within the visual element for which the marker is providing a cue. Examples of visual elements in which the spatial marker element can be nested include <video>, <animation>, <img>, and <text>.

The XML-based format definition for the marker is as follows:

Element Definition:

| Permissible Attributes: | |
| --- | --- |
| id | a unique identifier for the <spatial-marker> element; usable by other SMILE-based elements to refer to this element |
| skip-content | "true" or "false" only; allows for compatibility with future versions of SMIL |
| shape | "right-arrow", "left-arrow", "rect", "oval". "tick", "cross" or user-defined shape for the visual cue |
| bounding-rect | coordinates of the bounding rectangle for the spatial marker; specified as "left, top, right, bottom". |
| pen-size | "small", "medium", "large" |
| color | any preset or user-defined color for the spatial marker |
| begin | This attribute specifies the time for the explicit begin of an element. The attribute can contain the following two types of values:<br>(a) delay-value<br>A delay value is a clock-value measuring presentation time. Presentation time advances, at the speed of the presentation. It behaves like the time code shown on a counter of a tape-deck. It can be stopped, decreased or increased either by user actions, or by the player itself. The semantics of a delay value depend on the element's first ancestor that is a synchronization element (i.e., ancestors that are "a" or "switch" elements are ignored):<br>If this ancestor is a "par"element, the value defines a delay from the effective begin of that element.<br>If this ancestor is a "seq"element, the value defines a delay from the effective end of the first lexical predecessor that is a synchronization element.<br>(b) event-value<br>The element begins when a certain event occurs. Its value is an element-event. The element generating the event must be "in scope". The set of "in scope" elements S is determined as follows:<br>1. Take all children from the element's first ancestor that is a synchronization element and add them to S<br>2. Remove all "a" and "switch" elements from S. Add the children of all "a" elements to S, unless they are "switch" elements.<br>The resulting set S is the set of "in scope" elements. |
| Example 1 | <par><br>  <audio id="a" begin=6s" src="audio"/><br></par><br>             par<br>\|---------------------------\|<br>      6s<br>←------→\|-----------------\| |
| Example 2 | <seq><br>  <audio src="audio1"/><br>  <audio begin="5s" src="audio2"/><br></seq><br>audio            5s           audio<br>\|---------\|←---→\|-------------\| |
| Example 3 | <par><br>  <audio id="a" begin="6s" ... /><br>  <img begin="id (a) (4s)" ... /><br></par><br>             par<br>\|--------------------------\|<br>   6s           a<br>←---→\|-------------------\|<br>      4s<br>      ←--→<br>           img<br>          \|_____\| |
| dur | This attribute specifies the explicit duration of an element. The attribute value can be a clock value, or the string "indefinite". |
| end | This attribute specifies the explicit end of an element. The attribute can contain the same types of attribute values a the "begin" attribute. |
| Permissible Children: | none. |

One example of use of a spatial marker element according to the invention is as follows:

<img id = "id1" src = "myVideo.mjg">
    <spatial-marker id = "sm1" shape = "left-arrow" bounding-Rect = "100, 100, 200, 200" pen-size = "medium" color = "red" begin = "5s" end = "6s" />
</img>

In this example, the <spatial-marker> element of id=sm1 is synchronized to an image element of id=ID1. Spatial synchronization is provided by the coordinates of the bounding rectangle for the spatial marker sm1, which in this example is constrained to a rectangle {100, 100, 200, 200} relative to the bounding rectangle for the image ID1. Temporal synchronization is provided by the "begin" and "end" attributes, for spatial marker SM1; this example specifies that marker SM1 is displayed visibly by the browser beginning 5 seconds after the commencement of image ID1, and ending 6 seconds after its commencement. The shape of the spatial marker SM1 as defined by the "shape" attribute is a left-arrow, and its color as defined by the "color" attribute is red.

Figure 6A:
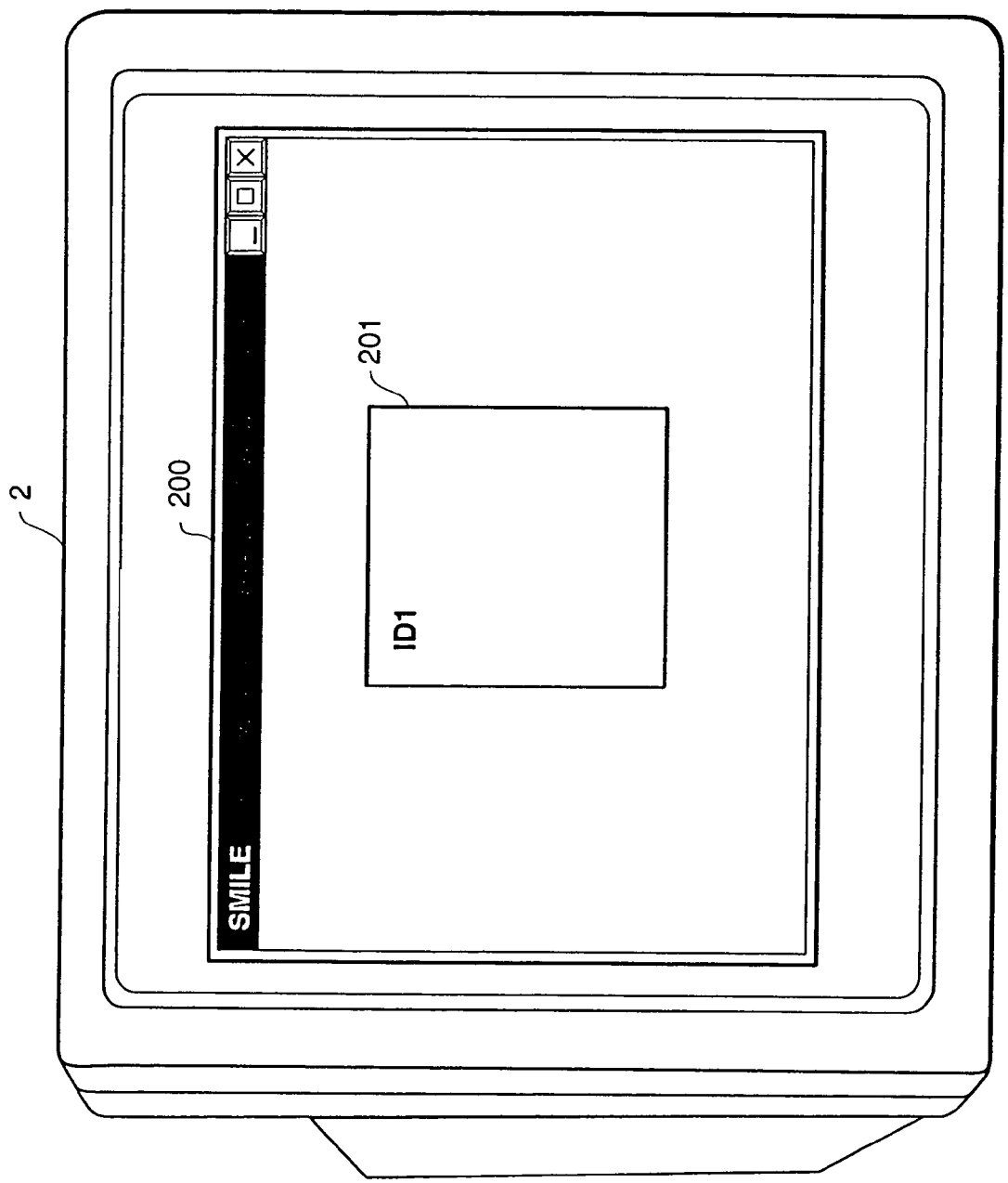
FIGS. 6a through 6c illustrate sequences of a multimedia presentation according to the present invention.
Figure 6B:
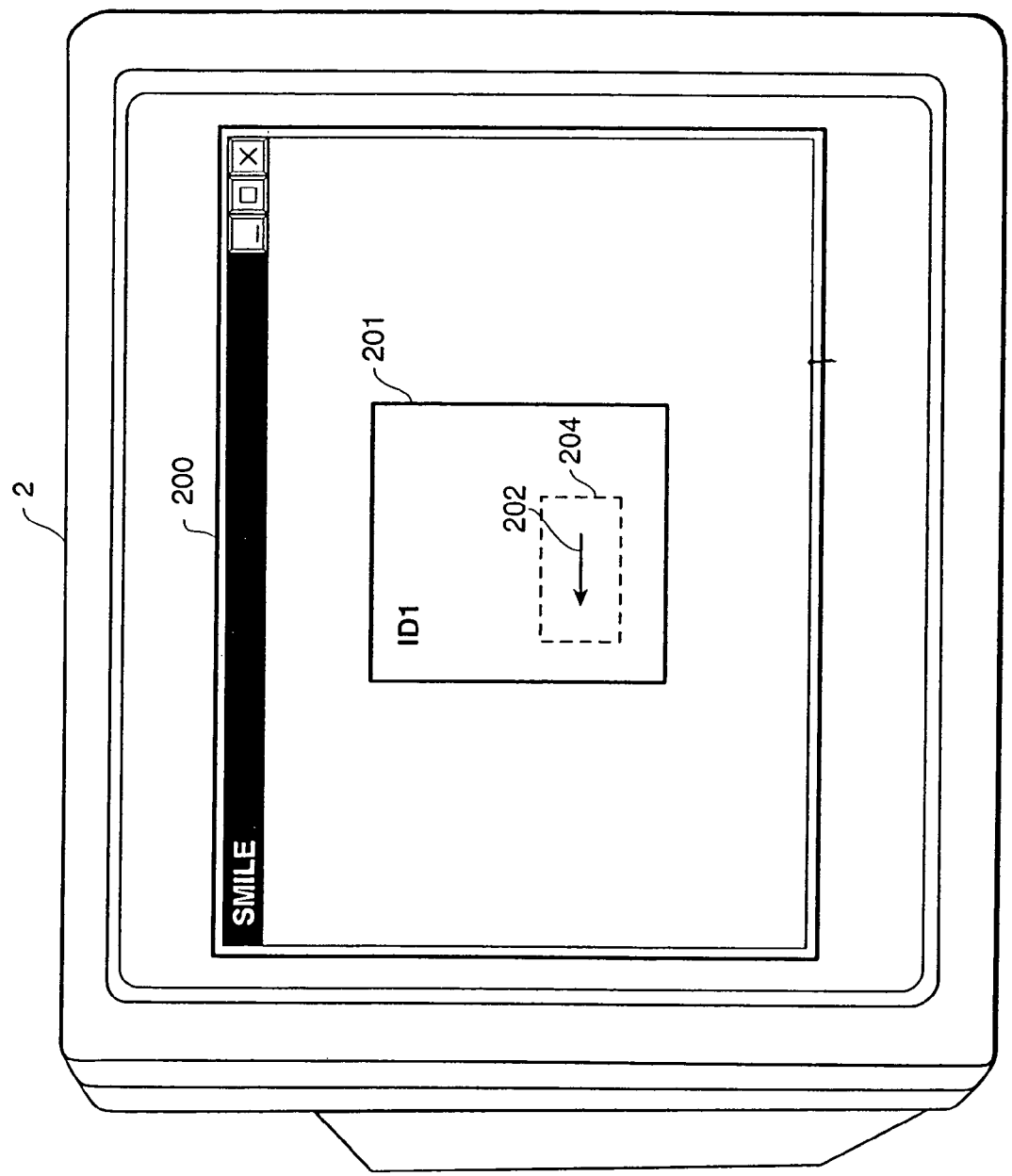
Figure 6C:
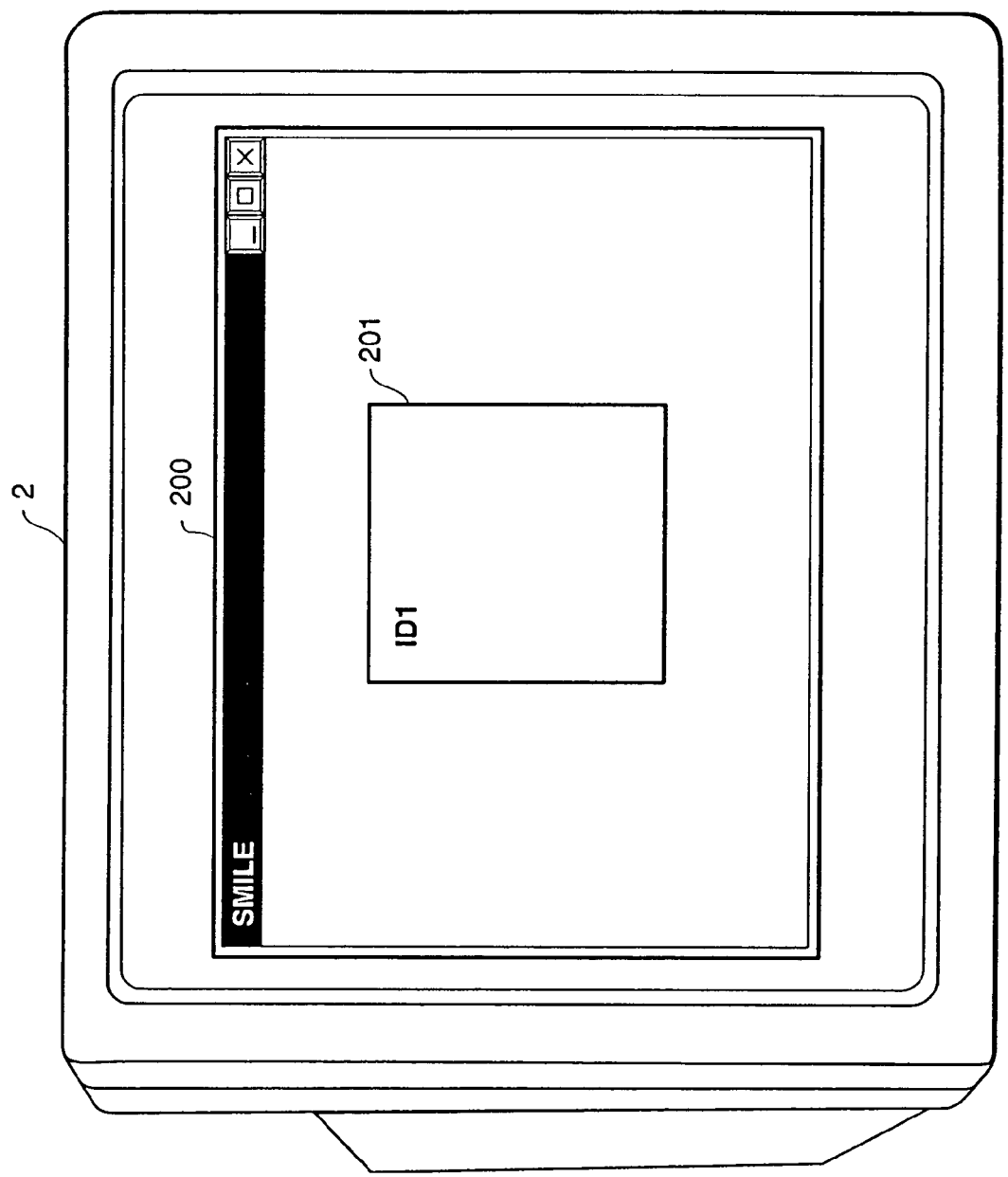

FIGS. 6A through 6C are views showing the display provided on display 2 by a web browser that encounters the above spatial marker in a SMILE-based multimedia document. FIG. 6A shows the appearance of display 2 from 0 through 5 seconds following commencement of display of image ID1; FIG. 6B shows the appearance of display 2 from 5 through 6 seconds following commencement of display of image ID1; and FIG. 6C shows the appearance of display 2 after six seconds following commencement of display of image ID1.

Thus, as seen in FIG. 6A, upon encountering the <img> element for image ID1, the browser displays the image at 201 within the browser's window 200. Commencing at 5 seconds after start of display of image ID1, the browser commences display of marker SM1, as shown in FIG. 6B. As seen there, the marker is a left-arrow 202 (whose red color is not depicted), and its position is within bounding rectangle 204 whose coordinates are {100, 100, 200, 200} relative to the bounding rectangle for image ID1. Finally, in FIG. 6C, after 6 seconds following commencement of the image ID1, the browser stops the display of marker SM1.

By virtue of the above arrangement, it is possible to superimpose nested visual cues over visual elements of a multimedia presentation, with the visual cues being synchronized both temporally and spatially with the visual elements.

While the present invention is described above with respect to what is currently considered its preferred embodiment, it is to be understood that the invention is not limited to that described above. To the contrary, the invention is intended to cover various modifications and equivalent arrangements included within the spirit and scope of the appended claims.

What is claimed is:

1. XML-based elements stored in a non-transitory computer-readable memory medium, wherein the XML-based elements are structured for use by a computer to display, via a web browser application executing on the computer, a multimedia presentation and a visual cue on a display of the computer, wherein the XML-based elements comprise at least:

a multimedia presentation element; and
a visual cue element whose XML code is nested within the code for the multimedia presentation element, and whose XML code identifies attributes of the visual cue element relative to the multimedia presentation element;
wherein the multimedia presentation element includes access information for the multimedia presentation; and
wherein the visual cue element, whose XML code is nested within the code for the multimedia presentation element, includes:
a visual attribute that defines a visual representation of the visual cue;
a spatial attribute that defines a boundary of the visual cue relative to a spatial position of a boundary of the multimedia presentation on the display; and
a temporal attribute that defines temporal characteristics of the visual cue based on the start of the multimedia presentation if the multimedia presentation is being displayed in parallel, or based on the end of the multimedia presentation if the multimedia presentation is being displayed in a sequence,
wherein the computer determines whether the multimedia presentation is being displayed in parallel or in a sequence, and uses the multimedia presentation element and the nested visual cue element to access the multimedia presentation and to synchronously display on the display the visual representation of the visual cue superimposed over the multimedia presentation, during a period of time which is based on the temporal characteristics of the visual cue as defined in the temporal attribute and on the temporal progression of the multimedia presentation, and at a location which is based on the spatial characteristics of the visual cue as defined in the spatial attribute and on the spatial position of the multimedia presentation.

2. An XML-based element, as defined in claim 1, wherein the temporal characteristics include at least one of begin time, end time, and duration.

3. An XML-based element, as defined in claim 1, wherein the visual representation includes color.

4. An XML-based element, as defined in claim 1, wherein the visual representation includes shape.

5. An XML-based element, as defined in claim 1, wherein the spatial characteristics include position.

6. A non-transitory computer-readable storage medium storing computer executable process steps to display a multimedia presentation and a visual cue on a display of a computer to a user, via a web browser application executing on the computer, and to process XML-based elements, wherein the XML based elements comprise:

a multimedia presentation element; and
a visual cue element whose XML code is nested within the code for the multimedia presentation element, and whose XML code identifies attributes of the visual cue element relative to the multimedia presentation element;
wherein the multimedia presentation element includes access information for the multimedia presentation; and
wherein the visual cue element, whose XML code is nested within the code for the multimedia presentation element, includes:
a visual attribute that defines a visual representation of the visual cue;
a spatial attribute that defines a boundary of the visual cue relative to a spatial position of a boundary of the multimedia presentation on the display; and
a temporal attribute that defines temporal characteristics of the visual cue based on the start of the multimedia presentation if the multimedia presentation is being displayed in parallel, or based on the end of the multimedia presentation if the multimedia presentation is being displayed in a sequence,
wherein the computer-executable process steps cause the computer to execute process steps comprising:
receiving the XML-based elements including the multimedia presentation element and the nested visual cue element;
determining whether the multimedia presentation is being displayed in parallel or in a sequence; and
using the multimedia presentation element and the nested visual cue element to access the multimedia presentation and to synchronously display on the display the visual representation of the visual cue superimposed over the multimedia presentation, during a period of time which is based on the temporal characteristics of the visual cue as defined in the temporal attribute and on the temporal progression of the multimedia presentation, and at a location which is based on the spatial characteristics of the visual cue as defined in the spatial attribute and on the spatial position of the multimedia presentation.

7. A computer-readable medium according to claim 6, wherein the temporal characteristics include at least one of begin time, end time, and duration.

8. A computer-readable medium according to claim 6, wherein the visual representation includes color.

9. A computer-readable medium according to claim 6, wherein the visual representation includes shape.

10. A computer-readable medium according to claim 6, wherein the spatial characteristics include position.

11. A method for displaying a multimedia presentation and a visual cue on a display of a computer executing an XML-based browser which processes XML-based elements, via a web browser application executing on the computer, wherein the XML-based elements comprise:
   a multimedia presentation element; and
   a visual cue element whose XML code is nested within the code for the multimedia presentation element, and whose XML code identifies attributes of the visual cue element relative to the multimedia presentation element;
   wherein the multimedia presentation element includes access information for the multimedia presentation; and
   wherein the visual cue element, whose XML code is nested within the code for the multimedia presentation element, includes:
      a visual attribute that defines a visual representation of the visual cue;
      a spatial attribute that defines a boundary of the visual cue relative to a spatial position of a boundary of the multimedia presentation on the display; and
      a temporal attribute that defines temporal characteristics of the visual cue based on the start of the multimedia presentation if the multimedia presentation is being displayed in parallel, or based on the end of the multimedia presentation if the multimedia presentation is being displayed in a sequence,
   wherein the method comprises:
   receiving the XML-based elements including the multimedia presentation element and the nested visual cue element;
   determining whether the multimedia presentation is being displayed in parallel or in a sequence; and
   using the multimedia presentation element and the nested visual cue element to access the multimedia presentation and to synchronously display on the display the visual representation of the visual cue superimposed over the multimedia presentation, during a period of time which is based on the temporal characteristics of the visual cue as defined in the temporal attribute and on the temporal progression of the multimedia presentation, and at a location which is based on the spatial characteristics of the visual cue as defined in the spatial attribute and on the spatial position of the multimedia presentation.

12. A method according to claim 11, wherein the temporal characteristics include at least one of begin time, end time, and duration.

13. A method according to claim 11, wherein the visual representation includes at least one of a shape and a color of the visual cue.

14. An apparatus comprising:
   a display;
   a computer-readable storage medium for storing computer-executable process steps that cause a multimedia presentation and a visual cue to be displayed on the display, via a web browser application executing on the computer, and for storing XML-based elements; and
   a processor to execute the process steps stored in the storage medium;
   wherein the XML-based elements comprise:
   a multimedia presentation element; and
   a visual cue element whose XML code is nested within the XML code for the multimedia presentation element;
   wherein the multimedia presentation element includes access information for the multimedia presentation; and
   wherein the visual cue element, which is nested within the multimedia presentation element, includes:
      a visual attribute that defines a visual representation of the visual cue;
      a spatial attribute that defines a boundary of the visual cue relative to a spatial position of a boundary of the multimedia presentation on the display; and
      a temporal attribute that defines temporal characteristics of the visual cue based on the start of the multimedia presentation if the multimedia presentation is being displayed in parallel, or based on the end of the multimedia presentation if the multimedia presentation is being displayed in a sequence, and
   wherein the process steps comprise:
   receiving the XML-based elements including the multimedia presentation element and the nested visual cue element;
   determining whether the multimedia presentation is being displayed in parallel or in a sequence; and
   using the multimedia presentation element and the nested visual cue element to access the multimedia presentation and to synchronously display on the display the visual representation of the visual cue superimposed over the multimedia presentation, during a period of time which is based on the temporal characteristics of the visual cue as defined in the temporal attribute and on the temporal progression of the multimedia presentation, and at a location which is based on the spatial characteristics of the visual cue as defined in the spatial attribute and on the spatial position of the multimedia presentation.

15. An apparatus according to claim 14, wherein the temporal characteristics include at least one of begin time, end time, and duration.

16. An apparatus according to claim 14, wherein the visual representation includes at least one of a shape and a color of the visual cue.

* * * * *